US012713233B2

(12) United States Patent
Khare et al.

(10) Patent No.: US 12,713,233 B2
(45) Date of Patent: Aug. 18, 2026

(54) METHOD AND APPARATUS FOR UE AND APPLICATION FUNCTION SESSION PROTECTION FOR MODEL TRANSFER

(71) Applicant: Nokia Technologies Oy, Espoo (FI)

(72) Inventors: Saurabh Khare, Bangalore (IN); Ranganathan Mavureddi Dhanasekaran, Munich (DE); Chaitanya Aggarwal, Munich (DE)

(73) Assignee: Nokia Technologies Oy, Espoo (FI)

( * ) Notice: Subject to any disclaimer, the term of this patent is extended or adjusted under 35 U.S.C. 154(b) by 36 days.

(21) Appl. No.: 18/863,405

(22) PCT Filed: May 10, 2023

(86) PCT No.: PCT/EP2023/062416
§ 371 (c)(1),
(2) Date: Nov. 6, 2024

(87) PCT Pub. No.: WO2023/217857
PCT Pub. Date: Nov. 16, 2023

(65) Prior Publication Data

US 2025/0301315 A1 Sep. 25, 2025

(30) Foreign Application Priority Data

May 13, 2022 (IN) ............................. 202241027669

(51) Int. Cl.
*H04W 12/0433* (2021.01)
*H04L 9/40* (2022.01)
*H04W 12/0431* (2021.01)

(52) U.S. Cl.
CPC ......... *H04W 12/0433* (2021.01); *H04L 63/06* (2013.01); *H04W 12/0431* (2021.01)

(58) Field of Classification Search
CPC .......... H04W 12/0433; H04W 12/0431; H04L 63/06
See application file for complete search history.

(56) References Cited

U.S. PATENT DOCUMENTS

2021/0392495 A1* 12/2021 Tsiatsis ............. H04W 12/0433
2022/0174063 A1* 6/2022 Wu ......................... H04L 63/06
(Continued)

FOREIGN PATENT DOCUMENTS

WO 2023/217746 A1 11/2023

OTHER PUBLICATIONS

Khan, Mohsin; Ginzboorg, Philip; Niemi, Valtteri; "AKMA: Delegated Authentication System of 5G," IEEE Communications Standards Magazine, vol. 5, No. 3, Sep. 2021, pp. 56-61.*
"3rd Generation Partnership Project; Technical Specification Group Services and System Aspects; Security architecture and procedures for 5G system (Release 17)", 3GPP TS 33.501, V17.5.0, Mar. 2022, pp. 1-293.

(Continued)

*Primary Examiner* — Victor Lesniewski
(74) *Attorney, Agent, or Firm* — Robert P. Michal, Esq.; Rimon PC

(57) ABSTRACT

In accordance with an example embodiment, a UE performs maintaining an AKMA, context including a UE identifier, an AKMA anchor key KAKMA, and a primary AKMA key identifier, A-KID; receiving from an application function, AF, a secondary AKMA key identifier, A-KID'; and validating the AF for the UE using the AKMA key identifier A-KID. The validating includes: obtaining from the secondary AKMA key identifier A-KID' an AKMA temporary UE identifier A-TID; and verifying whether the A-TID was included in the primary AKMA key identifier A-KID. If the verifying is positive, then the UE establishes an application session with the AF; and receives an artificial intelligence, AI, model from the AF; or otherwise rejects the application session with the AF.

1 Claim, 7 Drawing Sheets

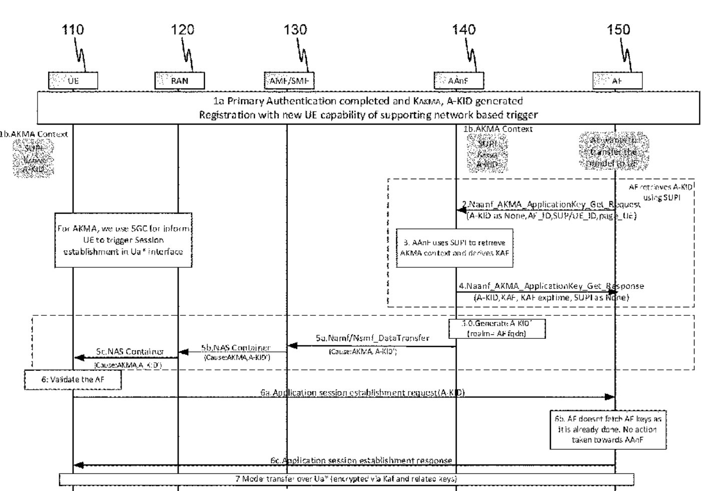

(56) References Cited

U.S. PATENT DOCUMENTS

| | | | | |
|---|---|---|---|---|
| 2022/0295272 | A1* | 9/2022 | Peng | H04W 12/0431 |
| 2022/0330019 | A1* | 10/2022 | Yu | H04W 12/069 |
| 2023/0068196 | A1* | 3/2023 | Sasi | H04L 9/0836 |
| 2023/0077391 | A1* | 3/2023 | Guo | H04L 63/0428 726/26 |
| 2023/0292112 | A1* | 9/2023 | Gupta | H04W 12/30 |
| 2023/0362636 | A1* | 11/2023 | Li | H04W 12/041 |
| 2024/0080664 | A1* | 3/2024 | Wang | H04W 12/041 |
| 2024/0292212 | A1* | 8/2024 | Rajadurai | H04W 12/06 |
| 2024/0356745 | A1* | 10/2024 | You | H04W 12/06 |
| 2024/0373215 | A1* | 11/2024 | Xing | H04W 12/0433 |
| 2025/0150818 | A1* | 5/2025 | Kim | H04L 9/0844 |
| 2025/0212001 | A1* | 6/2025 | Dany | H04W 12/033 |
| 2025/0350938 | A1* | 11/2025 | Liang | H04W 12/72 |

OTHER PUBLICATIONS

"New SID on Security and Privacy of AI/ML-based services and applications in 5G", 3GPP TSG-SA3 Meeting #106-e, S3-220422, Agenda: 4.18, Oppo, Feb. 14-25, 2022, 4 pages.

"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.5.0, Mar. 2022, 25 pages.

International Search Report and Written Opinion received for corresponding Patent Cooperation Treaty Application No. PCT/EP2023/062416, dated Jul. 11, 2023, 14 pages.

"New SID on Security and Privacy of AI/ML-based services and applications in 5G", 3GPP TSG-SA3 Meeting #107-e, S3-221113, Agenda: 6, Oppo, May 16-20, 2022, 4 pages.

* cited by examiner

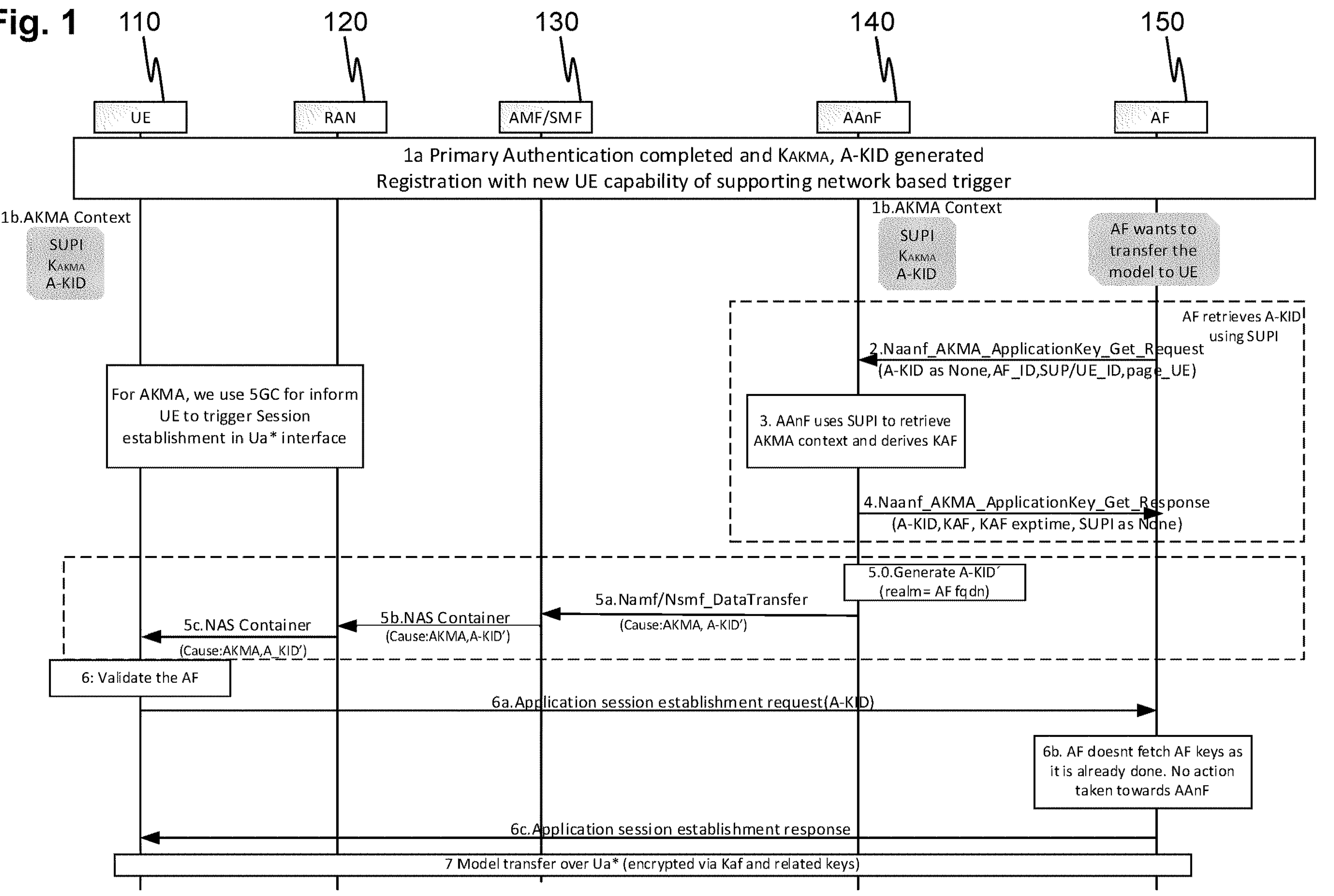
Fig. 1
110
120
130
140
150
UE
RAN
AMF/SMF
AAnF
AF
1a Primary Authentication completed and KAKMA, A-KID generated
Registration with new UE capability of supporting network based trigger
1b.AKMA Context
SUPI
KAKMA
A-KID
1b.AKMA Context
SUPI
KAKMA
A-KID
AF wants to transfer the model to UE
AF retrieves A-KID using SUPI
2.Naanf_AKMA_ApplicationKey_Get_Request
(A-KID as None,AF_ID,SUP/UE_ID,page_UE)
For AKMA, we use 5GC for inform UE to trigger Session establishment in Ua* interface
3. AAnF uses SUPI to retrieve AKMA context and derives KAF
4.Naanf_AKMA_ApplicationKey_Get_Response
(A-KID,KAF, KAF exptime, SUPI as None)
5.0.Generate A-KID´
(realm= AF fqdn)
5a.Namf/Nsmf_DataTransfer
(Cause:AKMA, A-KID')
5b.NAS Container
(Cause:AKMA,A-KID')
5c.NAS Container
(Cause:AKMA,A_KID')
6: Validate the AF
6a.Application session establishment request(A-KID)
6b. AF doesnt fetch AF keys as it is already done. No action taken towards AAnF
6c.Application session establishment response
7 Model transfer over Ua* (encrypted via Kaf and related keys)

Fig. 2

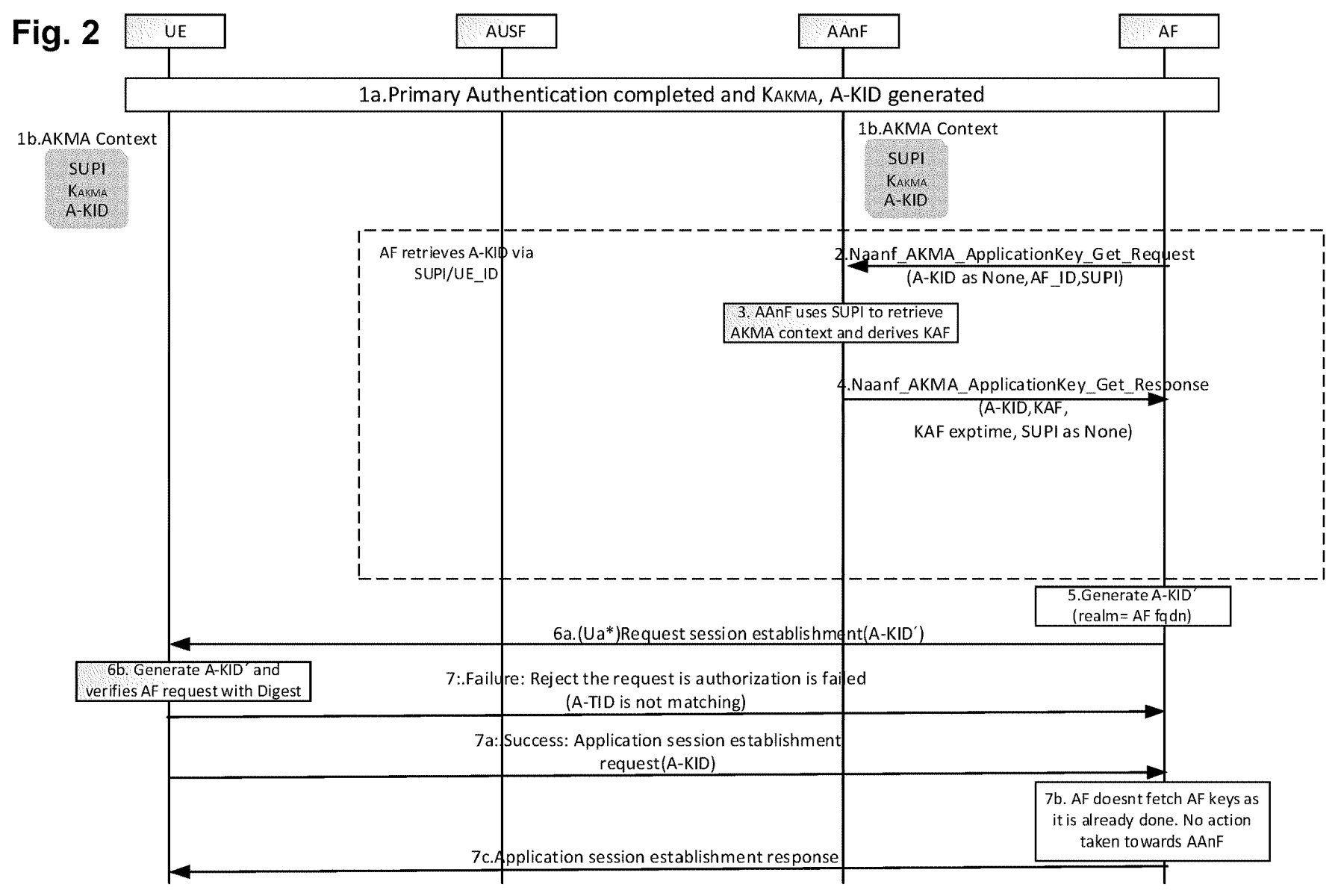

UE
AUSF
AAnF
AF
1a.Primary Authentication completed and $K_{AKMA}$, A-KID generated
1b.AKMA Context
SUPI
$K_{AKMA}$
A-KID
1b.AKMA Context
SUPI
$K_{AKMA}$
A-KID
AF retrieves A-KID via SUPI/UE_ID
2.Naanf_AKMA_ApplicationKey_Get_Request (A-KID as None,AF_ID,SUPI)
3. AAnF uses SUPI to retrieve AKMA context and derives KAF
4.Naanf_AKMA_ApplicationKey_Get_Response (A-KID,KAF, KAF exptime, SUPI as None)
5.Generate A-KID´ (realm= AF fqdn)
6a.(Ua*)Request session establishment(A-KID´)
6b. Generate A-KID´ and verifies AF request with Digest
7:.Failure: Reject the request is authorization is failed (A-TID is not matching)
7a:.Success: Application session establishment request(A-KID)
7b. AF doesnt fetch AF keys as it is already done. No action taken towards AAnF
7c.Application session establishment response

Fig. 3

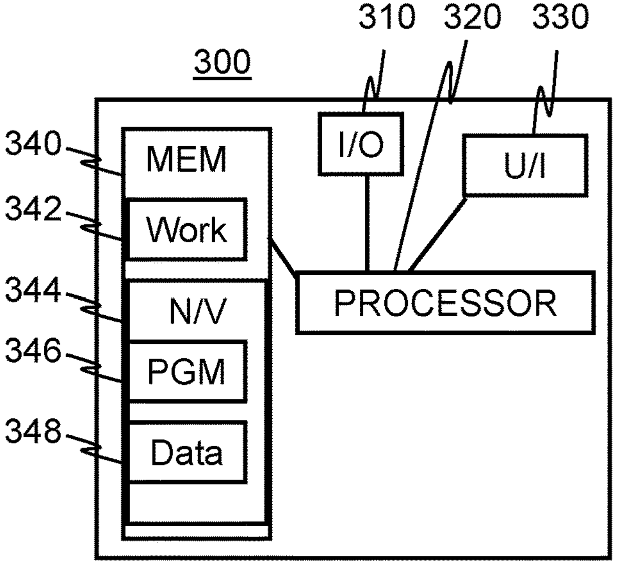

Fig. 4

401. maintaining an authentication and key management for applications, AKMA, context including a UE identifier, an AKMA anchor key $K_{AKMA}$, and a primary AKMA key identifier, A-KID 402. receiving from an application function, AF, a secondary AKMA key identifier, A-KID'

403. validating the AF for the UE using the AKMA key identifier A-KID 404. the validating comprising obtaining from the secondary AKMA key identifier A-KID' an AKMA temporary UE identifier A-TID 405. the validating comprising verifying whether the A-TID was included in the primary AKMA key identifier A-KID 406. if the verifying is positive, then establishing an application session with the AF 407. if the verifying is positive, then receiving an artificial intelligence, AI, model from the AF, otherwise rejecting the application session with the AF

A

408. authentication and key management for applications AKMA, based on 3GPP credentials in the 5G system, 5GS 409. in the validating, obtaining a secondary AKMA key identifier A-KID' from a non-access stratum, NAS container 410. in the validating, a NAS message comprising the NAS container may carry a new cause value identifying the type of the NAS container as comprising an AKMA A-KID'

411. including by the secondary AKMA key identifier A-KID' an AF identifier that identifies the AF, wherein the AF identifier may be embedded in the secondary AKMA key identifier A-KID 412. obtaining the secondary AKMA key identifier A-KID' over an application specific network application function interface Ua*

413. obtaining the secondary AKMA key identifier A-KID' obtained from a session establishment request sent by the AF to the UE 414. including in the secondary AKMA key identifier A-KID' a routing indicator, RID 415. including in the secondary AKMA key identifier A-KID' the AKMA temporary UE identifier, A-TID 416. including in the secondary AKMA key identifier A-KID' an identifier of the AF

B

417. including in the secondary AKMA key identifier A-KID' a fully qualifying domain name of the AF 418. including in the secondary AKMA key identifier A-KID' a home network identifier 419. providing an access and mobility management function with an indication that the UE supports a network-based trigger capability for an application session establishment 420. authenticating the UE to a home network operator and responsively obtaining the AKMA context prior to the maintaining of the AKMA context 421. including in the AKMA context an identifier of the UE, wherein the identifier of the UE may comprise a subscription permanent identifier, SUPI 422. defining the primary AKMA key identifier A-KID in a Network Access Identifier, NAI, format 423. generating by the UE the AKMA Anchor Key KAKMA and the primary AKMA key identifier A-KID from an authentication server function key, KAUSF, prior to the maintaining of the AKMA context 424. using an AKMA application key $K_{AF}$ in encryption or decryption of data exchanged in the application session 425. deriving the AKMA application key $K_{AF}$ from the AKMA anchor key KAKMA

Fig. 5

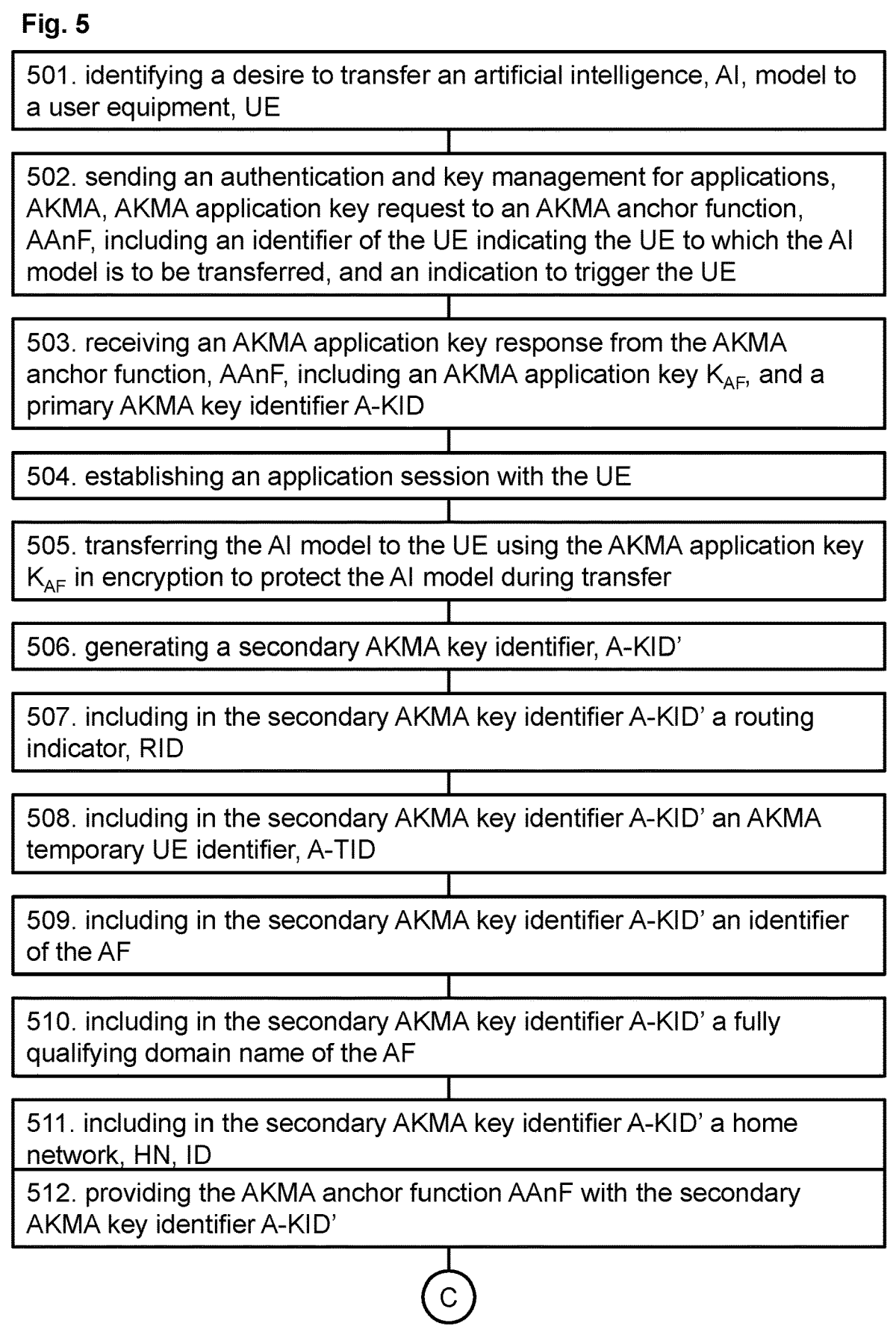

501. identifying a desire to transfer an artificial intelligence, AI, model to a user equipment, UE 502. sending an authentication and key management for applications, AKMA, AKMA application key request to an AKMA anchor function, AAnF, including an identifier of the UE indicating the UE to which the AI model is to be transferred, and an indication to trigger the UE 503. receiving an AKMA application key response from the AKMA anchor function, AAnF, including an AKMA application key $K_{AF}$, and a primary AKMA key identifier A-KID 504. establishing an application session with the UE 505. transferring the AI model to the UE using the AKMA application key $K_{AF}$ in encryption to protect the AI model during transfer 506. generating a secondary AKMA key identifier, A-KID'

507. including in the secondary AKMA key identifier A-KID' a routing indicator, RID 508. including in the secondary AKMA key identifier A-KID' an AKMA temporary UE identifier, A-TID 509. including in the secondary AKMA key identifier A-KID' an identifier of the AF 510. including in the secondary AKMA key identifier A-KID' a fully qualifying domain name of the AF 511. including in the secondary AKMA key identifier A-KID' a home network, HN, ID 512. providing the AKMA anchor function AAnF with the secondary AKMA key identifier A-KID'

C

513. providing the UE with the secondary AKMA key identifier A-KID', optionally over an application specific network application function interface Ua*, e.g., in an application session request 513. providing the UE with the secondary AKMA key identifier A-KID', optionally over an application specific network application function interface Ua*, e.g., in an application session request 514. receiving by the AF from the UE a success response and responsively performing the transferring of the AI model over the UA*

Fig. 6

601. maintaining an authentication and key management for applications, AKMA, context including a UE identifier, an AKMA anchor key KAKMA, and a primary AKMA key identifier, A-KID 602. receiving from an application function, AF, an authentication and key management for applications, AKMA, application key request including an identifier of the UE indicating the UE to which an artificial intelligence, AI, model is to be transferred, and an indication that a non-access stratum, NAS, based UE invocation is required 603. using the identifier of the UE to obtain the maintained AKMA context that corresponds to the UE 604. sending to the application function AF an AKMA application key response including a primary AKMA key identifier A-KID, and an AKMA application key $K_{AF}$ 605. generating a secondary AKMA key identifier, A-KID'

606. providing the UE with the secondary AKMA key identifier A-KID' via a NAS container, optionally over the Ua*

METHOD AND APPARATUS FOR UE AND APPLICATION FUNCTION SESSION PROTECTION FOR MODEL TRANSFER

RELATED APPLICATION

This application claims priority to PCT Patent Application No. PCT/EP2023/062416, filed 10 May 2023, which claims priority from India application No. 202241027669, filed on 13 May 2022, which is incorporated herein by reference in its entirety.

TECHNICAL FIELD

Various example embodiments relate to UE and application function (AF) session protection for model transfer.

BACKGROUND

This section illustrates useful background information without admission of any technique described herein representative of the state of the art.

It is planned to use Artificial Intelligence (AI)/Machine Learning (ML) to various tasks in a 5G system (5GS) for improved productivity. In particular, it is desirable to share an AI/ML model between an 5G Application Function (AF) and a UE on an initiative of the AF. The AI/ML models and their distributed use may induce risks of redundant communications or security and privacy issues unless adequate measures are taken to safeguard distributing of the AI/ML models between the AF and the UE.

In this document, term UE refers to one apparatus usable to implement mobile communications. For the sake of clarity, the term UE is used as a countable noun. In this document, an application session refers to a session between the AF and the UE for data exchange between the AF and the UE.

In this document, including a piece of information refers to containing that piece of information as such or in a derived form such that the piece of information is subsequently obtainable. The included piece of information may be encrypted, scrambled, compressed, in plain text, or in any other form.

SUMMARY

The scope of protection sought for various embodiments is set out by the independent claims. The embodiments and features, if any, described in this specification that do not fall under the scope of the independent claims are to be interpreted as examples useful for understanding various embodiments.

According to a first example aspect, there is provided a method in a user equipment, UE, comprising

- maintaining an authentication and key management for applications, AKMA, context including a UE identifier, an AKMA anchor key $K_{AKMA}$, and a primary AKMA key identifier, A-KID;
- receiving from an application function, AF, a secondary AKMA key identifier, A-KID';
- validating the AF for the UE using the AKMA key identifier A-KID, the validating comprising:
- obtaining from the secondary AKMA key identifier A-KID' an AKMA temporary UE identifier A-TID; and
- verifying whether the A-TID was included in the primary AKMA key identifier A-KID; and
- if the verifying is positive, then
- establishing an application session with the AF, and
- receiving an artificial intelligence, AI, model from the AF, otherwise rejecting the application session with the AF. The AI model may be a machine learning model. The method may comprise replacing an AI model previously received from the AF with a newer AI model received from the AF.

The method may comprise performing authentication and key management for applications AKMA, based on 3GPP credentials in the 5G system, 5GS.

The validating may comprise obtaining a secondary AKMA key identifier A-KID' from a non-access stratum, NAS, container. The validating may comprise obtaining a secondary AKMA key identifier A-KID' from a NAS container in a NAS message carrying a new cause value identifying the type of the NAS container as comprising an AKMA A-KID'.

The secondary AKMA key identifier A-KID' may include an AF identifier that identifies the AF. The AF identifier may be embedded in the secondary AKMA key identifier A-KID'.

The secondary AKMA key identifier A-KID' may be obtained over an application specific network application function interface Ua*. The secondary AKMA key identifier A-KID' may be obtained from a session establishment request sent by the AF to the UE. The secondary AKMA key identifier A-KID' may include a routing indicator, RID. The secondary AKMA key identifier A-KID' may include the AKMA temporary UE identifier, A-TID. The secondary AKMA key identifier A-KID' may include an identifier of the AF. The secondary AKMA key identifier A-KID' may include a fully qualifying domain name of the AF. The secondary AKMA key identifier A-KID' may include a home network identifier.

The method may further comprise providing an access and mobility management function with an indication that the UE supports a network-based trigger capability for an application session establishment.

The method may further comprise authenticating the UE to a home network operator and responsively obtaining the AKMA context prior to the maintaining of the AKMA context.

The AKMA context may include an identifier of the UE. The identifier of the UE may be a subscription permanent identifier, SUPI. The identifier of the UE may be a 5G globally unique subscription permanent identifier.

The primary AKMA key identifier A-KID may be in a Network Access Identifier, NAI, format. The NAI format may conform with clause 2.2 of IETF RFC 7542. The AKMA key identifier A-KID may include a username part. The username part may include a routing indicator, RID. The username part may include an AKMA temporary UE identifier, A-TID. The username part may identify the AF. The username part may include a fully qualifying domain name of the AF. The primary AKMA key identifier A-KID may include a realm part. The realm part may include a home network identifier.

The UE may generate the AKMA Anchor Key $K_{AKMA}$ and the primary AKMA key identifier A-KID from an authentication server function key, $K_{AUSF}$, prior to the maintaining of the AKMA context.

The method may comprise using an AKMA application key $K_{AF}$ in encryption or decryption of data exchanged in the application session. The AKMA application key $K_{AF}$ may be derived from the AKMA anchor key $K_{AKMA}$.

According to a second example aspect, there is provided a method in an application function, AF, comprising identifying a desire to transfer an artificial intelligence, AI, model to a user equipment, UE;

sending an authentication and key management for applications, AKMA, AKMA application key request to an AKMA anchor function, AAnF, including an identifier of the UE indicating the UE to which the AI model is to be transferred, and an indication to trigger the UE;

receiving an AKMA application key response from the AKMA anchor function, AAnF, including an AKMA application key $K_{AF}$, and a primary AKMA key identifier A-KID;

establishing an application session with the UE; and transferring the AI model to the UE using the AKMA application key $K_{AF}$ in encryption to protect the AI model in the transferring.

The method may comprise generating a secondary AKMA key identifier, A-KID'. The secondary AKMA key identifier A-KID' may include a routing indicator, RID. The secondary AKMA key identifier A-KID' may include an AKMA temporary UE identifier, A-TID. The secondary AKMA key identifier A-KID' may include an identifier of the AF. The secondary AKMA key identifier A-KID' may include a fully qualifying domain name of the AF. The secondary AKMA key identifier A-KID' may include a home network identifier.

The method may comprise providing the AKMA anchor function AAnF with the secondary AKMA key identifier A-KID'. Alternatively, the method may comprise providing the UE with the secondary AKMA key identifier A-KID'. The UE may be provided with the secondary AKMA key identifier A-KID' over an application specific network application function interface Ua*. The UE may be provided with the secondary AKMA key identifier A-KID' over the application specific network application function interface Ua* in an application session request. The AF may receive from the UE a success response and responsively perform the transferring of the AI model over the application specific network application function interface.

According to a third example aspect, there is provided a method in an authentication and key management for applications, AKMA, anchor function, AAnF, comprising maintaining an authentication and key management for applications, AKMA, context including a UE identifier, an AKMA anchor key $K_{AKMA}$, and a primary AKMA key identifier, A-KID;

receiving from an application function, AF, an authentication and key management for applications, AKMA, application key request including an identifier of the UE indicating the UE to which an artificial intelligence, AI, model is to be transferred, and an indication that a non-access stratum, NAS, based UE invocation is required;

using the identifier of the UE to obtain the maintained AKMA context that corresponds to the UE; and sending to the application function AF an AKMA application key response including a primary AKMA key identifier A-KID, and an AKMA application key $K_{AF}$.

The method may further comprise generating a secondary AKMA key identifier, A-KID'. The method may further comprise providing the UE with the secondary AKMA key identifier A-KID' via a NAS container. The UE may be provided with the secondary AKMA key identifier A-KID' over an application specific network application function interface.

According to a fourth example aspect, there is provided an apparatus comprising means for performing the method of any one of preceding example aspects.

According to a fifth example aspect, there is provided an apparatus comprising at least one processor, at least one memory, and program code, collectively configured to cause the apparatus to perform the method of any one of preceding example aspects when the program code is executed by the at least one processor.

The apparatus of the fourth or fifth example aspect may be implemented by a single server computer. The apparatus of the fourth or fifth example aspect may be implemented by a plurality of server computers. The apparatus of the fourth or fifth example aspect may be implemented by a virtualised computer. The apparatus of the fourth or fifth example aspect may be implemented by cloud computing. The apparatus of the fourth or fifth example aspect may be or comprise the UE. The apparatus of the fourth or fifth example aspect may be comprised by the UE. The apparatus of the fourth or fifth example aspect may be or comprise the AF. The apparatus of the fourth or fifth example aspect may be comprised by the AF The apparatus of the fourth or fifth example aspect may be or comprise the AAnF. The apparatus of the fourth or fifth example aspect may be comprised by the AAnF. The apparatus of the fourth or fifth example aspect may be a controller. The apparatus of the fourth or fifth example aspect may be a chipset. The apparatus may be a cloud computing entity.

According to a sixth example aspect, there is provided a system comprising the apparatus of the fourth or fifth example aspect configured to perform the method of the first example aspect. The system may comprise the apparatus of the fourth or fifth example aspect configured to perform the method of the second example aspect. The system may comprise the apparatus of the fourth or fifth example aspect configured to perform the method of the third example aspect.

According to a seventh example aspect, there is provided a computer program comprising computer executable program code configured to execute any method of the first or second or third example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory, or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in implementations. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments, reference is now made to the following descriptions taken in connection with the accompanying drawings in which:

FIG. 1 shows a schematic signalling chart of an example embodiment;

FIG. 2 shows a schematic signalling chart of an example embodiment;

FIG. 3 shows a block diagram of an apparatus of an example embodiment;

FIG. 4 shows a flow chart of operation of an example embodiment in a user equipment;

FIG. 5 shows a flow chart of operation of an example embodiment in an application function; and FIG. 6 shows a flow chart of operation of an example embodiment in an authentication and key management for applications anchor function.

DETAILED DESCRIPTION OF THE DRAWINGS

An example embodiment and its potential advantages are understood by referring to FIGS. 1 through 6 of the drawings. In this document, like reference signs denote like parts or steps.

FIG. 1 shows a schematic signalling chart of an example embodiment. FIG. 1 shows a user equipment UE 110, a radio access network 120, an access and mobility management function/session management function AMF/SMF 130, an authentication and key management for applications anchor function 140, and an application function AF 150. FIG. 1 further shows various steps, comprising Step 1*a*: The UE 110 provides a new UE indication that the UE 110 supports a network-based trigger capability. The AMF 130 stores this new UE capability for the UE 110.

Step 1*b*: Once the UE 110 is authenticated, the UE 110 and the AAnF 140 both store a corresponding $K_{AKMA}$ and a primary A-KID in an AKMA context of the UE 110.

The AF 150 identifies at some point of time a desire to send an AI model to the UE 110. Hence, the AF needs a secure application session for communication with UE.

Step 2: the AF 150 requests the AAnF 140 to provide the primary AKMA key identifier A-KID, and an AKMA application key $K_{AF}$ based on a UE identifier such as a SUPI or a UE ID of the UE 110 that is available with the AF 150. The AF 150 also includes an indication that a 5G NAS based UE invocation is required.

Step 3,4: the AAnF 140 uses the UE identifier, e.g., SUPI, to retrieve the AKMA context of the UE 110 and to provide the requested primary AKMA key identifier A-KID, the AKMA application key $K_{AF}$, and an AKMA application key $K_{AF}$ expiry time to the AF 150.

Step 5.0, 5*a*: the AAnF 140 generates a secondary AKMA key identifier A-KID'. The A-KID' is in an example embodiment in a NAI format as specified in clause 2.2 of IETF RFC 7542, such as a username@realm. The username part may include an RID and an AKMA Temporary UE Identifier, A-TID. The realm part may include an AF identification, such as a fully qualifying domain name, FQDN. In an alternative example embodiment, the username part includes the RID, the A-TID and the AF identification. Then, the realm part may include a Home Network identifier of the UE 110. As the AF 150 has indicated to inform the UE 110 via the NAS, the AAnF 140 sends a request to the AMF/SMF 130 and asks the AMF/SMF to provide A-KID' to the UE 110 over the new NAS container. The AAnF 140 may also include a new NAS message cause value: AKMA A-KID'.

In another example embodiment, the AF 150 provide the A-KID' to the AAnF 140 after step 4.

Step 5*b*, 5*c*: the SMF/AMF 130 provides the NAS container to UE 110.

Step 6: the UE 110 validates the AF 150 based on the A-KID' received. For example, it is verified whether the A-TID is correct. If yes, then the AF 150 is found validated.

Step 6*a*, 6*b*, 6*c*: If the AF 150 is validated, the UE 110 initiates an application session establishment request to the AF 150 (e.g., using the address received in the A-KID') with A-KID. Notice that the AF has identified the UE 110 based on the A-KID received from the AAnF 140.

Step 7: once the validation is completed, the AF 150 can transfer the AI model over the Ua* protocol.

FIG. 2 shows a schematic signalling chart of an example embodiment.

Here, the process is similar to that of FIG. 1. However, in Step 5, the AF 150 generates and provides the A-KID' to UE 110 over the Ua* protocol (Step 6*a*). The UE 110 validates the AF 150 based on the A-TID available in the A-KID'. When the validation is successful, the UE 110 initiates the communication with AF 150 (Step 7*a*, 7*b*, 7*c*)

If the validation of the AF 150 fails, the UE 110 rejects the request (Step 7).

As shown in steps 6*b* and 7*b*, the AF 150 needs not fetch the AF keys on establishing the application session with the UE 110.

FIG. 3 shows a block diagram of an apparatus 300 according to an embodiment of the invention.

The apparatus 300 comprises a memory 340 including a persistent computer program code 350. The apparatus 300 further comprises a processor 320 for controlling the operation of the apparatus 300 using the computer program code 340, a communication unit 310 for communicating with other nodes. The communication unit 310 comprises, for example, a local area network (LAN) port; a wireless local area network (WLAN) unit; Bluetooth unit; cellular data communication unit; or satellite data communication unit. The processor 320 comprises, for example, any one or more of: a master control unit (MCU); a microprocessor; a digital signal processor (DSP); an application specific integrated circuit (ASIC); a field programmable gate array; and a microcontroller.

FIG. 4 shows a flow chart of operation of an example embodiment in the UE, comprising any one or more of following steps:

401. maintaining an authentication and key management for applications, AKMA, context including a UE identifier, an AKMA anchor key $K_{AKMA}$, and a primary AKMA key identifier, A-KID;

402. receiving from an application function, AF, a secondary AKMA key identifier, A-KID';

403. validating the AF for the UE using the AKMA key identifier A-KID;

404. the validating comprising obtaining from the secondary AKMA key identifier A-KID' an AKMA temporary UE identifier A-TID;

405. the validating comprising verifying whether the A-TID was included in the primary AKMA key identifier A-KID;

406. if the verifying is positive, then establishing an application session with the AF;

407. if the verifying is positive, then receiving an artificial intelligence, AI, model from the AF, otherwise rejecting the application session with the AF.

The method may comprise performing any one or more of the following steps:

408. authentication and key management for applications AKMA, based on 3GPP credentials in the 5G system, 5GS;

409. in the validating, obtaining a secondary AKMA key identifier A-KID' from a non-access stratum container;

410. in the validating, the NAS container may comprise a new cause value identifying the type of the NAS container as comprising an AKMA A-KID';

411. including by the secondary AKMA key identifier A-KID' an AF identifier that identifies the AF, wherein the AF identifier may be embedded in the secondary AKMA key identifier A-KID';

412. obtaining the secondary AKMA key identifier A-KID' over an application specific network application function interface Ua*;

413. obtaining the secondary AKMA key identifier A-KID' obtained from a session establishment request sent by the AF to the UE;

414. including in the secondary AKMA key identifier A-KID' a routing indicator, RID;

415. including in the secondary AKMA key identifier A-KID' the AKMA temporary UE identifier, A-TID;

416. including in the secondary AKMA key identifier A-KID' an identifier of the AF;

417. including in the secondary AKMA key identifier A-KID' a fully qualifying domain name of the AF;

418. including in the secondary AKMA key identifier A-KID' a home network identifier;

419. providing an access and mobility management function with an indication that the UE supports a network-based trigger capability for an application session establishment;

420. authenticating the UE to a home network operator and responsively obtaining the AKMA context prior to the maintaining of the AKMA context;

421. including in the AKMA context an identifier of the UE, wherein the identifier of the UE may comprise a subscription permanent identifier, SUPI;

422. defining the primary AKMA key identifier A-KID in a Network Access Identifier, NAI, format;

423. generating by the UE the AKMA Anchor Key KAKMA and the primary AKMA key identifier A-KID from an authentication server function key, KAUSF, prior to the maintaining of the AKMA context;

424. using an AKMA application key $K_{AF}$ in encryption or decryption of data exchanged in the application session; and/or

425. deriving the AKMA application key $K_{AF}$ from the AKMA anchor key KAKMA.

FIG. 5 shows a flow chart of operation of an example embodiment in the AF comprising any one or more of the following steps:

501. identifying a desire to transfer an artificial intelligence, AI, model to a user equipment, UE;

502. sending an authentication and key management for applications, AKMA, AKMA application key request to an AKMA anchor function, AAnF, including an identifier of the UE indicating the UE to which the AI model is to be transferred, and an indication to trigger the UE, such as a page_UE indication;

503. receiving an AKMA application key response from the AKMA anchor function, AAnF, including an AKMA application key $K_{AF}$, and a primary AKMA key identifier A-KID;

504. establishing an application session with the UE; and/or

505. transferring the AI model to the UE using the AKMA application key $K_{AF}$ in encryption to protect the AI model during transfer.

The method may comprise performing any one or more of the following steps:

506. generating a secondary AKMA key identifier, A-KID';

507. including in the secondary AKMA key identifier A-KID' a routing indicator, RID;

508. including in the secondary AKMA key identifier A-KID' an AKMA temporary UE identifier, A-TID;

509. including in the secondary AKMA key identifier A-KID' an identifier of the AF;

510. including in the secondary AKMA key identifier A-KID' a fully qualifying domain name of the AF;

511. including in the secondary AKMA key identifier A-KID' a home network, HN, identifier;

512. providing the AKMA anchor function AAnF with the secondary AKMA key identifier A-KID';

513. providing the UE with the secondary AKMA key identifier A-KID', optionally over an application specific network application function interface Ua*, e.g., in an application session request; and/or

514. receiving by the AF from the UE a success response and responsively performing the transferring of the AI model over the UA*.

FIG. 6 shows a flow chart of operation of an example embodiment in the AAnF, comprising any one or more of the following steps:

601. maintaining an authentication and key management for applications, AKMA, context including a UE identifier, an AKMA anchor key KAKMA, and a primary AKMA key identifier, A-KID;

602. receiving from an application function, AF, an authentication and key management for applications, AKMA, application key request including an identifier of the UE indicating the UE to which an artificial intelligence, AI, model is to be transferred, and an indication that a non-access stratum, NAS, based UE invocation is required;

603. using the identifier of the UE to obtain the maintained AKMA context that corresponds to the UE; and/or

604. sending to the application function AF an AKMA application key response including a primary AKMA key identifier A-KID, and an AKMA application key KAF.

The method may comprise performing any one or more of the following steps:

605. generating a secondary AKMA key identifier, A-KID'; and/or

606. providing the UE with the secondary AKMA key identifier A-KID' via a NAS container, optionally over an application specific network application function interface.

Without in any way limiting the scope, interpretation, or application of the claims appearing below, a technical effect of one or more of the example embodiments disclosed herein is that the UE can validate the AF for model transfer. Another technical effect of one or more of the example embodiments disclosed herein is that no new secrets need to be established between the UE and the AF for confidentiality of the model transfer.

Embodiments may be implemented in software, hardware, application logic or a combination of software, hardware, and application logic. In an example embodiment, the application logic, software, or an instruction set is maintained on any one of various conventional computer-readable media. In the context of this document, a "computer-readable medium" may be any non-transitory media or means that can contain, store, communicate, propagate, or transport the instructions for use by or in connection with an instruction execution system, apparatus, or device, such as a computer, with one example of a computer described and depicted in FIG. 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A user equipment (UE) comprising:

at least one processor; and at least one memory storing instructions that, when executed by the at least one processor, cause the UE at least to perform:

maintaining an authentication and key management for applications, AKMA, context including a UE identifier, an AKMA anchor key $K_{AKMA}$, and a primary AKMA key identifier (A-KID), wherein the primary A-KID is in a Network Access Identifier (NAI) format that includes an AKMA temporary UE identifier (A-TID);

receiving from an application function (AF) a secondary AKMA key identifier (A-KID') in an application session establishment request received over an application-specific network application function interface (Ua*);

validating the AF for the UE using the AKMA key identifier A-KID, the validating comprising:

obtaining from the secondary AKMA key identifier A-KID' an AKMA temporary UE identifier A-TID; and verifying whether the A-TID was included in the primary AKMA key identifier A-KID; and if the verifying is positive, then establishing an application session with the AF; and receiving an artificial intelligence, AI, model from the AF; or otherwise rejecting the application session with the AF, wherein the validating comprises obtaining a secondary AKMA key identifier A-KID' from a non-access stratum (NAS) wherein the secondary AKMA key identifier A-KID' includes an AF identifier that identifies the AF, wherein the secondary AKMA key identifier A-KID' is obtained from a session establishment request sent by the AF to the UE;

performing authentication and key management for applications (AKMA) based on 3GPP credentials in the 5G system (5GS);

using an AKMA application key $K_{AF}$ derived from the AKMA anchor key (KAKMA), in encryption or decryption of data exchanged in the application session; and authenticating the UE to a home network operator and responsively obtaining the AKMA context prior to the maintaining of the AKMA context.

* * * * *